(12) United States Patent
Watanabe

(10) Patent No.: US 7,395,807 B2
(45) Date of Patent: Jul. 8, 2008

(54) FUEL INJECTION CONTROL SYSTEM DESIGNED TO ELIMINATE OVERLAP BETWEEN MULTIPLE FUEL INJECTION EVENTS

(75) Inventor: Mitsura Watanabe, Oobu (JP)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 11/724,231

(22) Filed: Mar. 15, 2007

(65) Prior Publication Data

US 2007/0215097 A1    Sep. 20, 2007

(30) Foreign Application Priority Data

Mar. 17, 2006    (JP)    ............... 2006-074986

(51) Int. Cl.
*F02B 5/00*    (2006.01)
*F02M 51/00*    (2006.01)

(52) U.S. Cl. ................ 123/305; 123/478; 123/480

(58) Field of Classification Search ........... 123/299, 123/300, 304, 305, 332, 333, 478, 480, 294, 123/431, 434
See application file for complete search history.

(56) References Cited

U.S. PATENT DOCUMENTS

| | | | | |
|---|---|---|---|---|
| 4,528,960 | A * | 7/1985 | Mizuno et al. ............... | 122/478 |
| 5,568,799 | A * | 10/1996 | Akazaki et al. ............. | 123/480 |
| 5,878,713 | A * | 3/1999 | Kadota ....................... | 123/305 |
| 7,234,439 | B2 * | 6/2007 | Kikutani et al. ............. | 123/299 |
| 7,278,396 | B2 * | 10/2007 | Leone et al. ................ | 123/431 |
| 2005/0229898 | A1 | 10/2005 | Kikutani et al. | |
| 2006/0016431 | A1 * | 1/2006 | Mashiki et al. ............. | 123/431 |

FOREIGN PATENT DOCUMENTS

| | | |
|---|---|---|
| JP | 09-151758 | 6/1997 |
| JP | 2001-207898 | 8/2001 |
| JP | 2002-013430 | 1/2002 |
| JP | 2005-171931 | 6/2005 |
| JP | 2005-299565 | 10/2005 |

* cited by examiner

*Primary Examiner*—John T Kwon
(74) *Attorney, Agent, or Firm*—Nixon & Vanderhye P.C.

(57) ABSTRACT

A fuel injection control system for a multi-cylinder internal combustion engine mounted in a vehicle is provided. The system works to schedule execution of a sequence of multiple injections of fuel into each of cylinders of the engine and determines whether events of any two of the injections scheduled to be executed in any two of the cylinders overlap in time with each other or not. If so, the system determines which of the two of the injections overlapping each other should be rescheduled based on operating condition of the vehicle and reschedules the execution of one of the two of the injections, as determined to be rescheduled, so as to eliminate overlap with any of the events of the injections. This avoids undesirable application of load on the system or the delay in activating fuel injectors which may arise from simultaneous activation of two of the injectors.

18 Claims, 8 Drawing Sheets

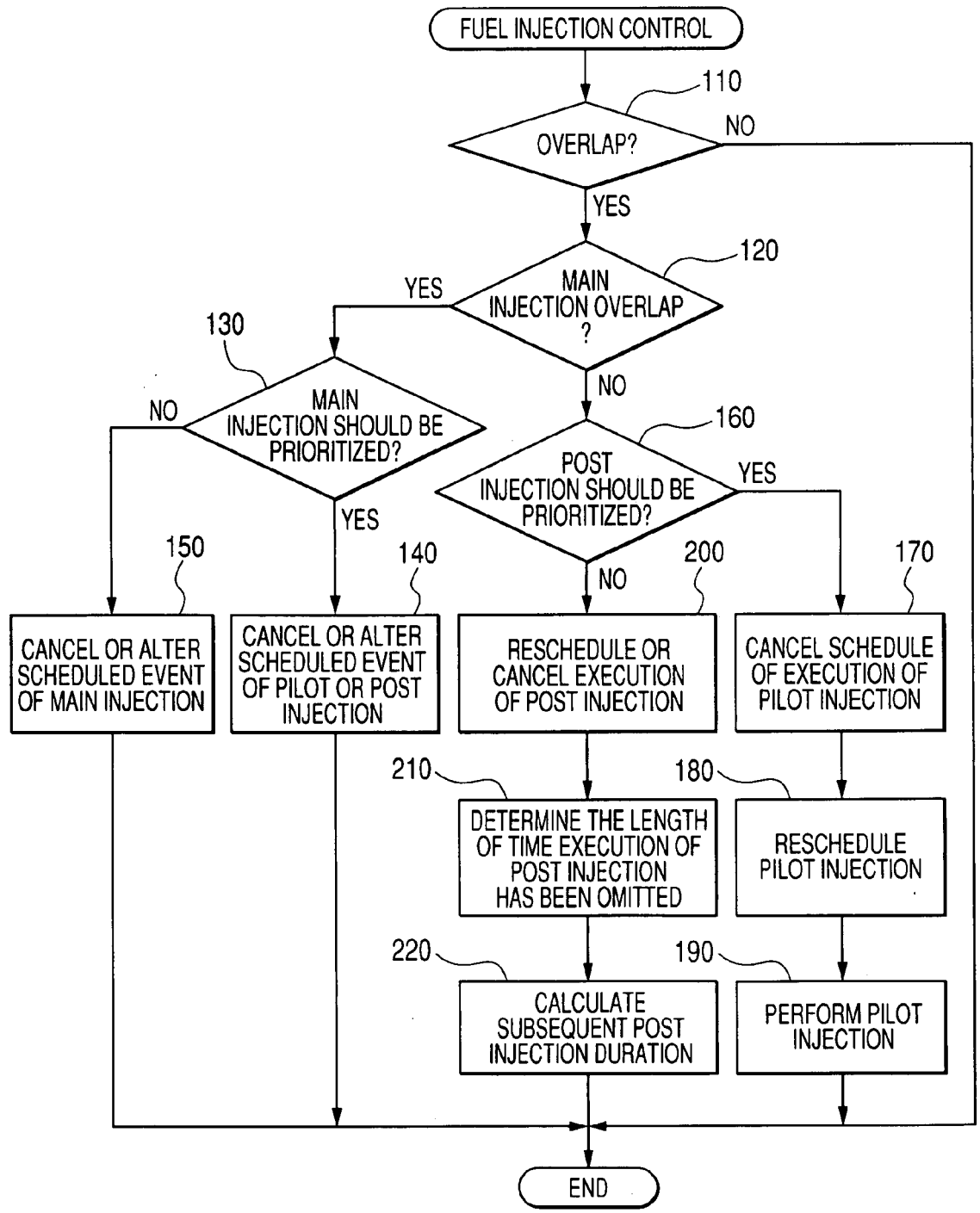

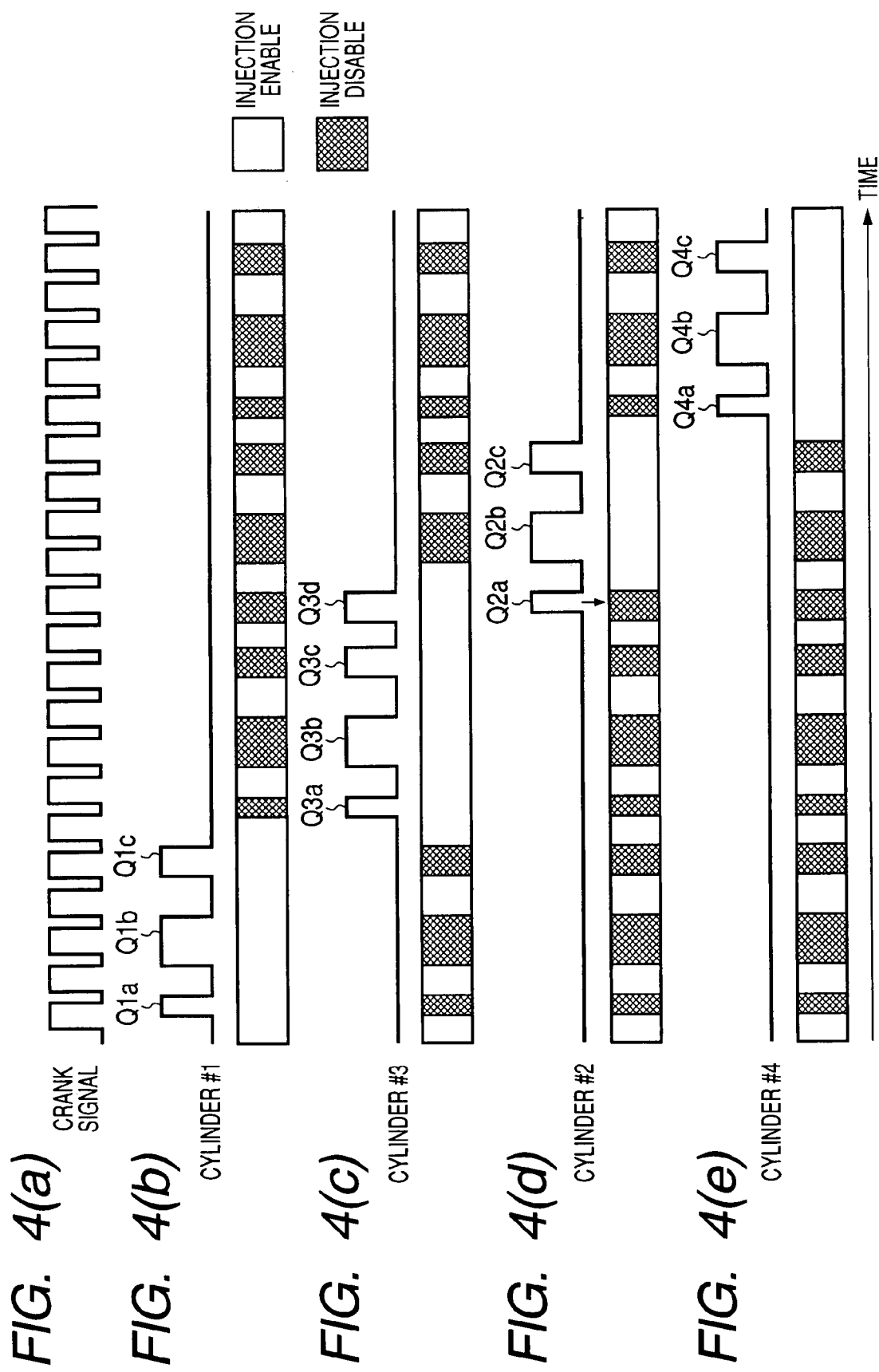

FUEL INJECTION CONTROL SYSTEM DESIGNED TO ELIMINATE OVERLAP BETWEEN MULTIPLE FUEL INJECTION EVENTS

CROSS REFERENCE TO RELATED DOCUMENT

The present application claims the benefit of Japanese Patent Application No. 2006-74986 filed on Mar. 17, 2006, the disclosure of which is totally incorporated herein by reference.

BACKGROUND OF THE INVENTION

1. Technical Field of the Invention

The present invention relates generally to a fuel injection control system such as a common rail system for automotive diesel engines which is designed to activate fuel injectors to spray jets of fuel into each of cylinders of the engine through a sequence of fuel injection events, and more particularly, to such a system designed to cancel or reschedule the execution of the fuel injection events so as to eliminate overlap in time between the fuel injection events.

2. Background Art

There are known fuel injection control systems such as common rail injection systems which are designed to open each of injectors installed in one of cylinders of a diesel engine several times in each engine operating cycle (i.e., a four-stroke cycle) including intake or induction, compression, combustion, and exhaust in order to improve the fuel economy and quality of exhaust emissions, and minimize mechanical noise or vibration of the engine.

Some of the above type of fuel injection control systems are designed to control each of the injectors to perform pilot, main, and post injections of fuel into the engine. The purpose of the pilot injection is to promote or activate combustion of fuel in the cylinders and reduce combustion noise and vibrations of the engine. The purpose of the main injection is to move the piston of the engine. The purpose of the post injection is to re-burn particulate matter (PM) resulting from the combustion of an air-fuel mixture in the engine.

FIG. 7 illustrates an example of a circuit structure of the above type of fuel injection control system.

The fuel injection control system is designed to energize coils L1 to L4 of four injectors to spray the fuel into first to fourth cylinders #1 to #4 of a diesel engine. The fuel injection control system includes a typical microcomputer 50 made up of a CPU 55, a ROM 56, and a RAM 57. The microcomputer 50 works to turn on and off a switching device TRo of a step-up transformer 51 cyclically at high speeds to develop the voltage higher than a battery voltage VB at one of ends of a coil Lo which is opposite the other leading to the battery voltage VB. Such high-voltage is retained in a capacitor C through a diode Do. When the microcomputer 50 turns on a switching device TR1 connected to a downstream side of the coil L1 and a switching device TRk, it will cause the high-voltage to be released from the capacitor C, so that a peak current flows to the coil L1 through a diode D1 and a common terminal To to open the injector for the first cylinder #1. Afterwards, the microcomputer 50 turns off the switching device TRk and switches a switching device TRh between the on- and off-state cyclically to produce a flow of a constant current through the coil L1 through the diode D2 and the common terminal To, thereby keeping the injector for the first cylinder #1 open. The microcomputer 50 works to control operations of the injectors for the second to fourth cylinders #2 to #4 in the same manner. A diode D3 serves as a free-wheeling diode.

FIGS. 8(a) and 8(b) demonstrate operations of the injectors for two of the injectors for the first and third cylinders #1 and #3 as an example. NE pulses are pulse signals to be outputted from a crank sensor installed on a crankshaft of the diesel engine at regular angular intervals of rotation of the crankshaft. The injection timing at which each of the injectors starts to spray the fuel into the engine is determined based on the angular position of the crankshaft or the NE pulses. For instance, the time the fuel injection event Q1a, as illustrated in FIG. 8(a), is to be initiated is determined based on input of a specified one of the NE pulse and the time required by the crankshaft to rotate through a selected angle. Specifically, the fuel injection event Q1a is initiated after elapse of the time required for the crankshaft to rotate through the selected angle following the input of the specified one of the NE pulses. Subsequently, the fuel injection event Q1b is initiated a time T1a after completion of the fuel injection event Q1a. Similarly, the fuel injection event Q1c is initiated a time T1b after completion of the fuel injection event Q1b. The same is true for the third cylinder #3. Specifically, the time the fuel injection event Q3a is to be initiated is determined based on input of a specified one of the NE pulse. The fuel injection event Q3b is initiated a time T3a after completion of the fuel injection event Q3a.

FIG. 8(b) illustrates for the case where the diesel engine starts to accelerate from a steady state in which the diesel engine runs at a constant speed.

In the steady state, the injection timing at which each of fuel injection events Q1d, Q1e, Q1f, and Q3c are launched is determined in the same manner as that illustrated in FIG. 8(a). When the diesel engine has started to accelerate at time T, the microcomputer 50 works to change the injection timing to be synchronous with rising of the NE pulses (see Q3d) in order to increase the accuracy in controlling the injection timing. This will cause, as illustrated in FIG. 8(b), the injection timing for the third cylinder #3 to be advanced, which may result in an overlap of, for example, the fuel injection event Q3d with the fuel injection event Q1f for the first cylinder #1.

When the injection timings for the first and third cylinders #1 and #3 overlap each other, the microcomputer 50 is required to energize the coils L1 and L3 simultaneously. This will, however, result in a decrease in amount of current flowing through each of the coils L1 and L3 as compared with when only either of the coils L1 and L3 is energized. Particularly, when the peak current is supplied to the coils L1 and L3 simultaneously, it will drop in each of the coils L1 and L3, thus resulting in a delay in opening the injectors and a decrease in quantity of fuel injected into the engine. In order to avoid this problem, Japanese Patent First Publication No. 2005-299565 (US 2005/0229898 A1), assigned to the same assignee as that of this application, teaches a fuel injection control system engineered to extend the length of time the injectors are energized to achieve a desired quantity of fuel injected to the engine when the injection timings overlap each other.

The above type of fuel injection control system may, however, also encounters another drawback when the peak current is supplied to, for example, the coils L1 and L3 simultaneously. Specifically, the simultaneous supply of the peak current to the coils L1 and L3 may cause the current which is about two times that when the peak current is applied to either one of the coils L1 and L3 to flow through the switching device TRk, the diode D1, and the common terminal To, thus resulting in a large load thereon. For instance, when it is required to open the injector for the first cylinder #1, the microcomputer 50 works to apply the peak current I1 to the coil L1 through the common terminal To. When it is required to open the injector for the third cylinder #3, the microcomputer 50 works to apply the peak current I3 to the coil L3 through the common terminal To. When it is required to open the injectors for the first and third cylinders #1 and #3 simultaneously, the peak current I1 flows through the coil L1, while the peak current I3 flows through the coil L3, so that the sum of the peak current I1 and I3 flows through the switching device TRk, the diode D1, and the common terminal To.

The fuel injection control system, as taught in the above publication, eliminates the former problem, but has a difficulty in addressing the latter problem that devices other than the injectors are subjected to a large electrical load.

When it is determined that two injection durations will overlap each other, the one of the two injectors which is to be energized next may be inhibited from injecting the fuel into the engine to avoid the simultaneous flow of the peak current through the coils of the two injectors. This is, however, objectionable to running conditions of the vehicle. For instance, when drive torque is required to run the vehicle, but the execution of the main injection is cancelled, a difficulty may be encountered in ensuring the stability of running of the vehicle. Additionally, when the execution of the pilot injection is cancelled during acceleration of the vehicle, it may result in knocking of the engine or increase in combustion noise. Further, when a large amount of particulate matter (PM) is trapped in a diesel particulate filter (DPF), and the execution of the post injection is cancelled, it may result in a lack of burning the PM, thus decreasing the ability of emission gas purification.

SUMMARY OF THE INVENTION

It is therefore a principal object of the invention to avoid the disadvantages of the prior art.

It is another object of the invention to provide a fuel injection control apparatus for a multi-cylinder internal combustion engine mounted in a vehicle which is designed to ensure the stability in running the vehicle at a minimized load on the apparatus.

According to one aspect of the invention, there is provided a fuel injection control apparatus which may be employed in automotive multi-cylinder diesel engine. The fuel injection control apparatus comprises: (a) injectors each of which, when energized, works to spray fuel into one of cylinders of an engine of a vehicle; (b) an operating condition determining circuit working to determine preselected operating conditions of the engine and the vehicle; and (c) a controller working to schedule execution of a sequence of multiple injections of the fuel into each of the cylinders through control of a corresponding one of the injectors in each operating cycle of the engine based on the operating conditions, as determined by the operating condition determining circuit. The controller determines whether an overlapping condition where events of any two of the injections scheduled to be executed in any two of the cylinders overlap in time with each other is met or not. When the overlapping condition is determined to be met, the controller determines which of the two of the injections overlapping each other should be rescheduled based on the operating condition of the vehicle, as determined by the operating condition determining circuit, and reschedules execution of one of the two of the injections, as determined to be rescheduled, so as to eliminate overlap with any of the events of the injections. Specifically, when at least one of the scheduled events of the sequence of injections to be executed in any one of the cylinders of the engine is in coincidence in time with that to be executed in another of the cylinders, the controller reschedules the execution of either of the overlapping events of the injections so as to eliminate the overlap with any of the events of the injections to be executed in the other cylinders without sacrificing running conditions of the vehicle, thereby avoiding the undesirable application of load on the apparatus or the delay in activating the injectors, as described above.

In the preferred mode of the invention, the controller works to perform one of a first rescheduling operation and a second rescheduling operation. The first rescheduling operation is to shift the timing of the one of the injections, as determined to be rescheduled, so as to eliminate the overlap with any of the events of the injections. The second rescheduling operation is to omit at least a portion of a duration of the one of the injection, as determined to be rescheduled, so as to eliminate overlap with other of the two of the injections. The second rescheduling operation is useful when it is difficult to execute the first scheduling operation without any overlap with the durations of the injections in the other cylinders. Of course, the second rescheduling operation may work to cancel the schedule of execution of the one of the injections completely.

The sequence of multiple injections of the fuel into each of the cylinders may include a main injection to operate the engine, a first sub-injection to be executed prior to the main injection to activate inside of the cylinder, and a second sub-injection to be executed following the main injection to burn out particulate matter, as produced by combustion of the fuel in the engine. The controller works to determine as the overlapping condition whether a duration of each of the main injection, the first sub-injection, and the second sub-injection, as scheduled to be executed in one of the cylinders, overlaps that of one of the main injection, the first sub-injection, and the second sub-injection, as scheduled to be executed in another of the cylinders, or not. Each of the first sub-injection and the second sub-injection may be scheduled to be executed two or more times in each of the operating cycle of the engine.

The controller works to monitor the operating condition of the vehicle, as determined by the operating condition determining circuit, to determine whether drive torque is required by the vehicle or not. When it is determined that the duration of one of the first sub-injection and the second sub-injection scheduled to be executed in one of the cylinders overlaps that of the main injection scheduled to be executed in another of the cylinders and that the drive torque is determined to be required by the vehicle, the controller reschedules the execution of the one of the first sub-injection and the second sub-injection, as determined as overlapping in the duration thereof with the main injection, so as to eliminate overlap with any of the events of the injections. Specifically, the controller prioritizes the execution of the main injection to ensure the stability in driving the vehicle.

The controller may monitor the operating condition of the vehicle, as determined by the operating condition determining circuit, to determine whether no drive torque is required by the vehicle or not. When it is determined that the duration of one of the main injection and the first sub-injection scheduled to be executed in one of the cylinders overlaps that of the second sub-injection scheduled to be executed in another of the cylinders and that no drive torque is determined to be required by the vehicle, the controller reschedules the execution of the one of the main injection and the first sub-injection, as determined as overlapping in the duration thereof with the second sub-injection, so as to eliminate overlap with any of the events of the injections.

A filter such as a diesel particulate filter (DPF) may be installed in an exhaust system of the engine to trap or collect the particulate matter, as produced by the combustion of the fuel in the engine. The injection control apparatus may work to execute the second sub-injection to burn out the particulate matter trapped in the filter. In this case, the controller determines whether the amount of the particulate matter trapped in the filter is greater than a given value (e.g., an upper limit) or not. When it is determined that the duration of one of the main injection and the first sub-injection scheduled to be executed in one of the cylinders overlaps that of the second sub-injection scheduled to be executed in another of the cylinders and that the amount of the particulate matter is greater than the given value, the controller reschedules the execution of the one of the main injection and the first sub-injection, as determined as overlapping in the duration thereof with the second sub-injection, so as to eliminate overlap with any of the events of the injections. Specifically, the controller prioritizes the execution of the second sub-injection to ensure the burning out of the particulate matter to regenerate the filter.

The controller may work to monitor the operating condition of the vehicle, as determined by the operating condition determining circuit, to determine whether the vehicle is acceleration or not. When it is determined that the duration of the second sub-injection scheduled to be executed in one of the cylinders overlaps that of the first sub-injection scheduled to be executed in another of the cylinders and that the vehicle is accelerating, the controller reschedules the execution of the second sub-injection, as determined as overlapping in the duration thereof with the first sub-injection, so as to eliminate overlap with any of the events of the injections. Usually, when the vehicle is accelerating, the engine is required to produce the drive torque. Therefore, the controller prioritizes the execution of the first sub-injection to promote the combustion of the fuel in the engine.

When it is determined that the second sub-injection, as scheduled to be executed in one of the cylinders, overlaps that of one of the main injection, the first sub-injection, and the second sub-injection, as scheduled to be executed in another of the cylinders, the controller may omit at least a portion of the duration of the second sub-injection, as determined as overlapping that of the one, so as to eliminate overlap with the one, and also determine a duration of the second sub-injection scheduled to be executed subsequently in one of the cylinders so as to compensate for the omitted portion of the duration of the second sub-injection. Specifically, the controller compensates for a lack of the fuel arising from the omission of the duration of the second sub-injection in a subsequent event of the second sub-injection of the fuel into the engine.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings:

FIG. 3 is a flowchart of a program to be executed by the control unit of FIG. 2 to reschedule execution of injection of fuel into an engine;

FIG. 4(a) is a timing chart which demonstrates a sequence of crank signals outputted every rotation of a crankshaft of an engine through a given angle;

FIG. 4(b) is an injection permission decision chart for a first cylinder #1 of an engine which is prepared by the electronic control unit, as illustrated in FIG. 2;

FIG. 4(c) is an injection permission decision chart for a third cylinder #3 of an engine which is prepared by the electronic control unit, as illustrated in FIG. 2;

FIG. 4(d) is an injection permission decision chart for a second cylinder #2 of an engine which is prepared by the electronic control unit, as illustrated in FIG. 2;

FIG. 4(e) is an injection permission decision chart for a fourth cylinder #4 of an engine which is prepared by the electronic control unit, as illustrated in FIG. 2;

DESCRIPTION OF THE PREFERRED EMBODIMENTS

Figure 1:
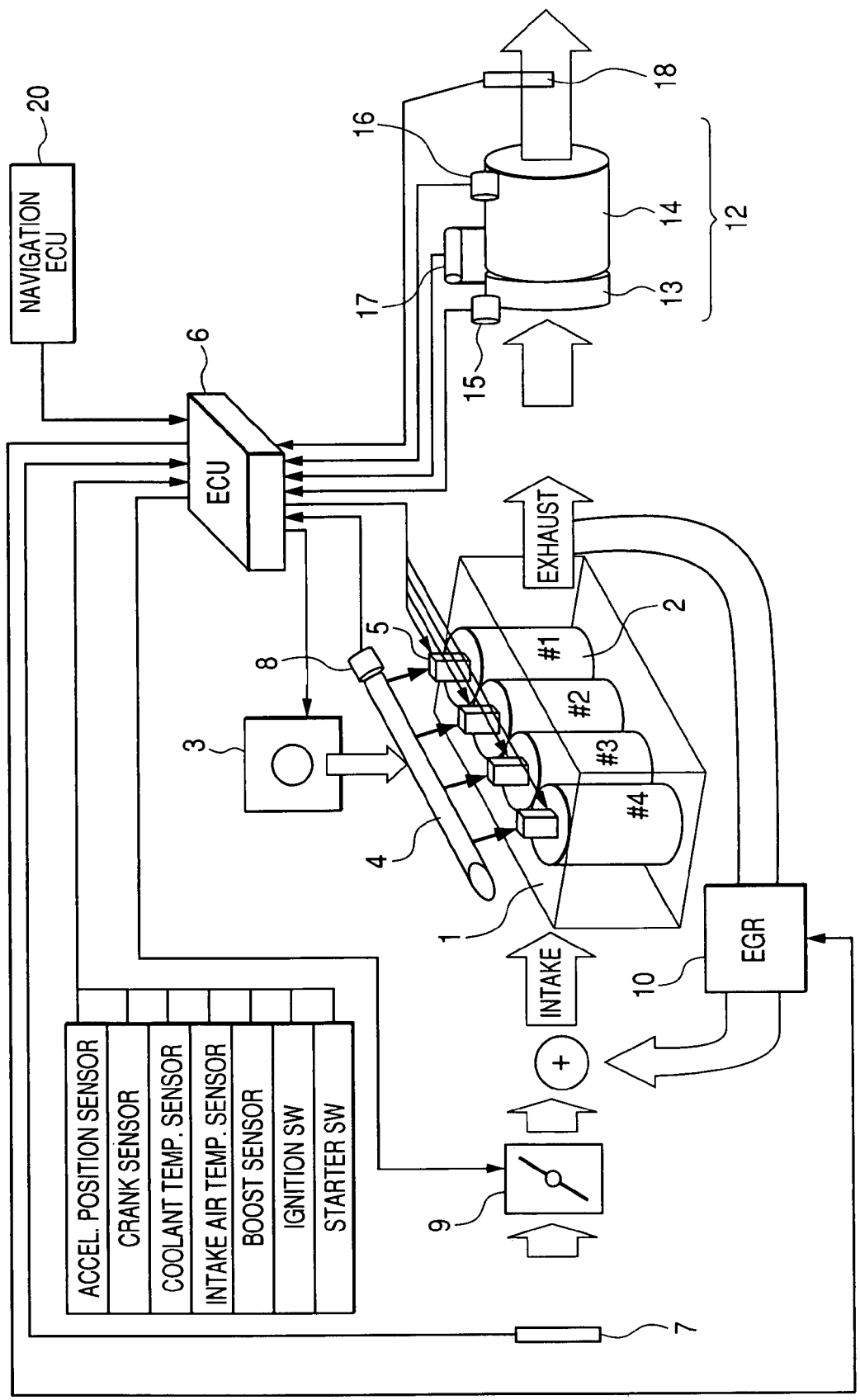
FIG. 1 is a block diagram which shows a fuel injection control system according to the invention.

Referring to the drawings, wherein like reference numbers refer to like parts in several views, particularly to FIG. 1, there is shown a fuel injection control system according to the first embodiment of the invention which is engineered as a common rail fuel injection system for four-cylinder diesel engines to be mounted in automotive vehicles.

The fuel injection control system, as referred to herein, is designed to control an operation of a diesel engine 1 equipped with four cylinders 2 which will also be expressed below by

1 to #4. The fuel injection control system includes a high-pressure fuel pump 3, a common rail 4, injectors 5 one for each of the cylinders 2, an electronic control unit (ECU) 6, and a pressure sensor 8. The high-pressure fuel pump 3 works to feed fuel, as pumped out of a fuel tank, to the common rail 4. The common rail 4 stores therein the fuel at a controlled high pressure and supplies the fuel to each of the injectors 5.

The ECU 6 works to monitor an output of an air-flow sensor 7 (also called air flow meter) installed in an intake pipe leading to the engine 1 to determine the amount of air charged into the engine 1 and also monitor an output of the pressure sensor 8 installed in the common rail 4 to measure the pressure of fuel within the common rail 4.

The ECU 6 also monitor, as parameters indicating operating conditions of the engine 1, an output of an accelerator position sensor indicating an effort or position of an accelerator pedal, an output of a crank sensor (or a crankshaft position sensor) produced in synchronization with rotation of a crankshaft of the engine 1, an output of a coolant temperature sensor indicating the temperature of coolant of the engine 1, an output of an intake air temperature sensor indicating the temperature of air to be charged into the engine 1, an output of a boost sensor indicating the boost pressure (i.e., the pressure of air in the intake system), an ignition on-off signal outputted from an ignition switch, and a starter on-off signal outputted from a starter switch to turn on or off an engine starter. The crank sensor is designed to output a pulse in synchronization with rotation of the crankshaft each time the crankshaft advances through a preselected angle CA (Crank Angle). For instance, the crank sensor outputs the pulses whose leading edges rise at regular intervals of 6° CA.

The ECU 6 is also connected to a navigation ECU 20 to sample navigation information representing that the vehicle is now running on an upward slope, a downward slope, or a horizontal road.

The ECU 6 works to use the above described inputs to calculate engine control parameters to control the high-pressure pump 3 and the injectors 5.

The fuel injection control system also includes an intake air throttle valve 9 and an EGR device 10 which are controlled by the ECU 6 to control emissions from the engine 1.

The engine 1 is also equipped with an after-treatment system 12 which works to traps and burn out particulate matter (PM) contained in the exhaust emissions from the engine 1. The after-treatment system 12 consists of an oxidation catalyst 13 and a particulate matter filter (also called a diesel particulate filter) 14. The oxidation catalyst 13 works to produce heat for burning out of the particulate matter. The particulate matter filter 14 works to trap the particulate matter therein. An input temperature sensor 15 is installed in an inlet port of the oxidation catalyst 13. An output temperature sensor 16 is installed in an outlet port of the particulate matter filter 16. The ECU 6 samples outputs of the input temperature sensor 15 and the output temperature sensor 16 to determine the temperatures of the oxidation catalyst 13 and the particulate matter filter 14, respectively.

The after-treatment system 12 also includes a differential pressure sensor 17 which measures a difference in pressure between the input and output sides of the particulate matter filter 14. The ECU 6 monitors an output of the differential pressure sensor 17 to determine the amount of particulate matter stored in the particulate matter filter 14.

The oxidation catalyst 13 is subjected to the exhaust gas emitted from the engine 1 so that it is heated up to about 200° C. and then supplied with HC arising from injection of fuel into the engine 1 for after-treatment of the exhaust gas so that it is further heated up to 600° C. to transfer intense heat to the particulate matter filter 14.

The fuel injection control system also has an air-fuel ratio sensor (also called an A/F sensor) 18 installed in an exhaust pipe of the engine 1 to measure, for example, the concentration of $O_2$ contained in the exhaust. The ECU 6 samples an output of the A/F sensor 18 to determine the air-fuel ratio of a mixture charged into the engine 1 for use in controlling the EGR device 10 and the after-treatment system 12. Specifically, the ECU 6 uses the output of the A/F sensor 18 to determine the EGR amount (i.e., the amount of a portion of exhaust gas to be returned back to the inlet of the engine 1) and the amount of particulate matter trapped in the particulate matter filter 14.

Figure 2:
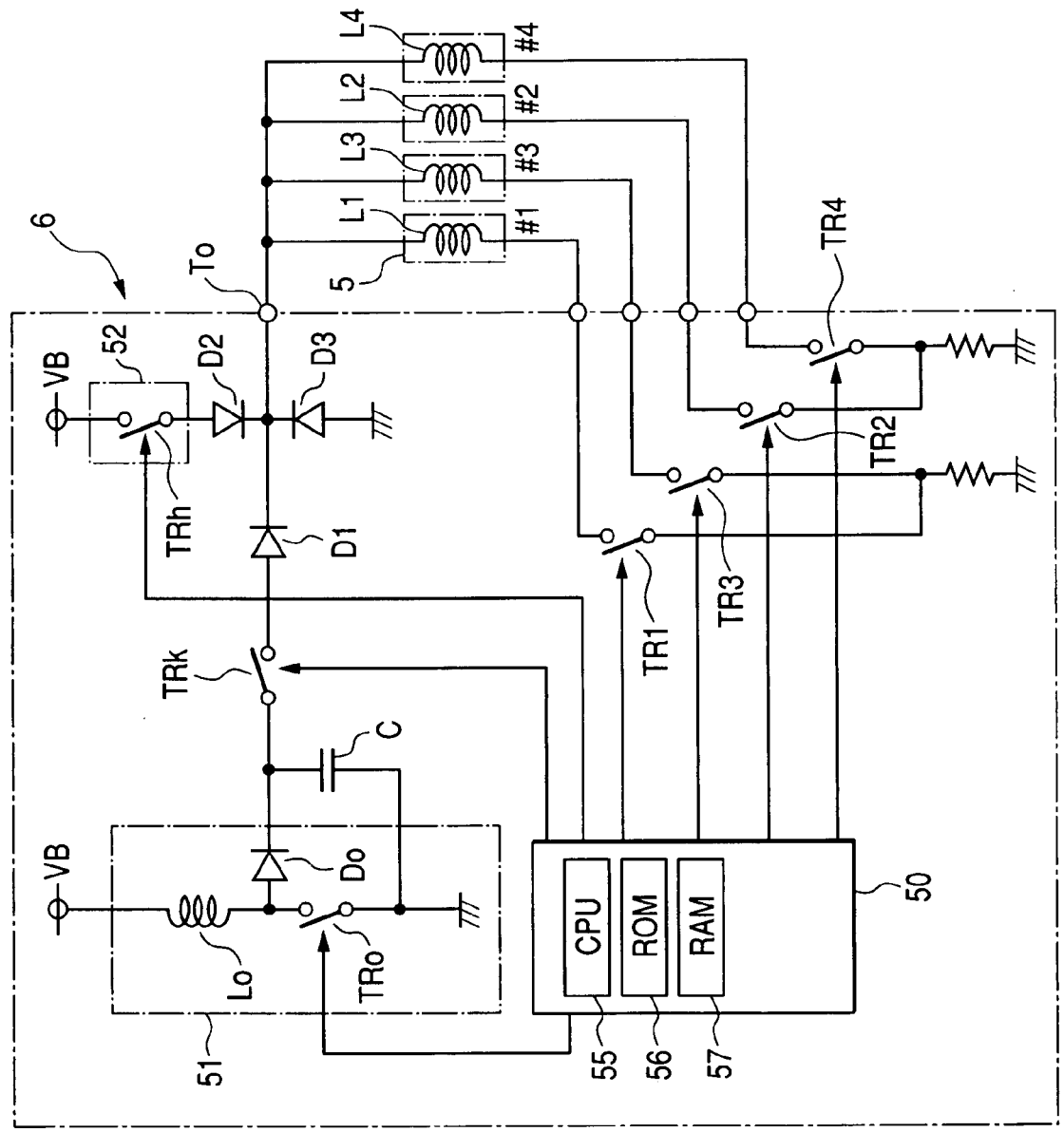
FIG. 2 is a circuit diagram which shows internal structures of an electronic control unit and injectors in the fuel injection control system of FIG. 1.
Figure 7:
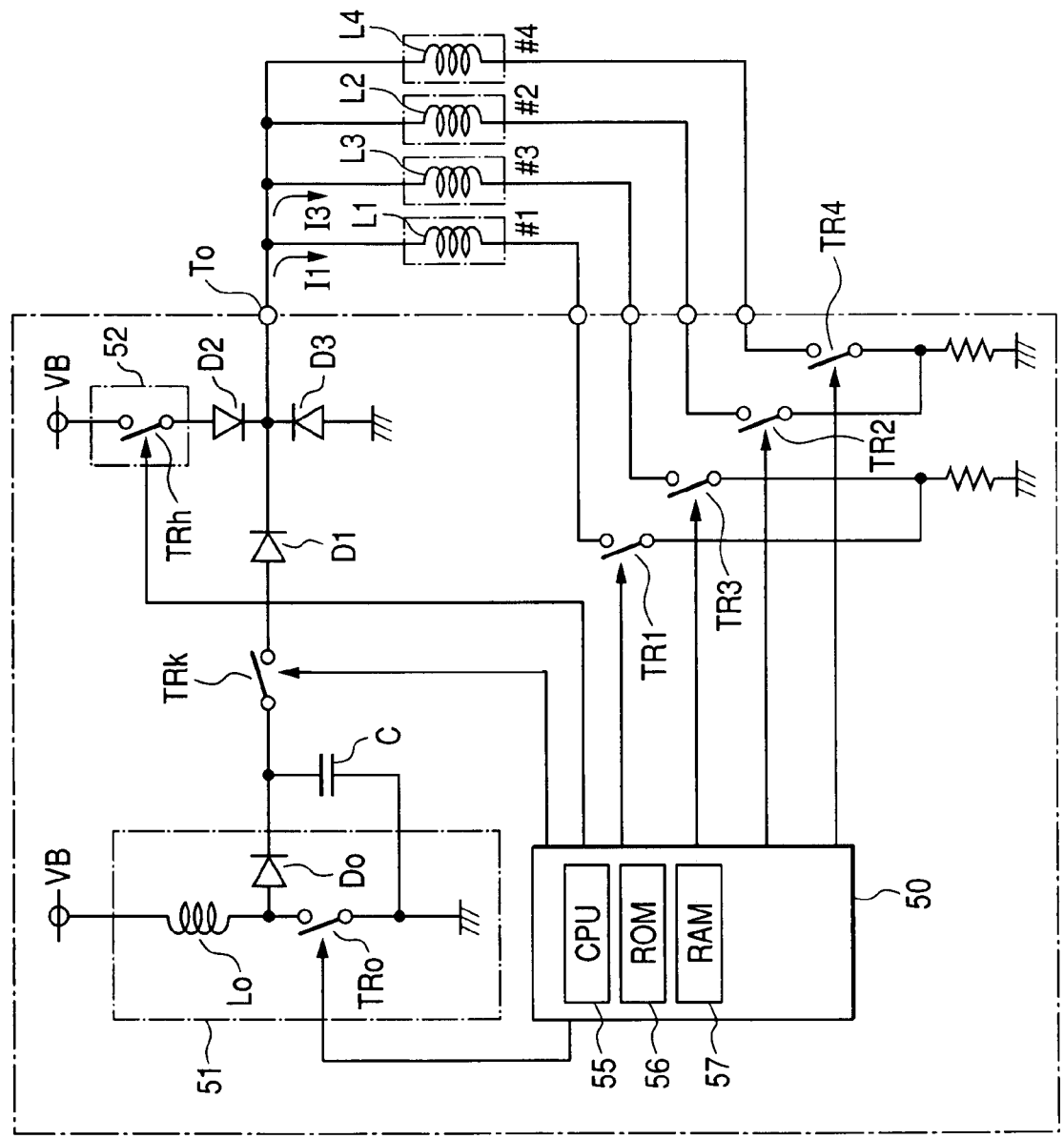
FIG. 7 is a circuit diagram which shows internal structures of a controller and injectors of a conventional fuel injection control system.
Figure 8A:
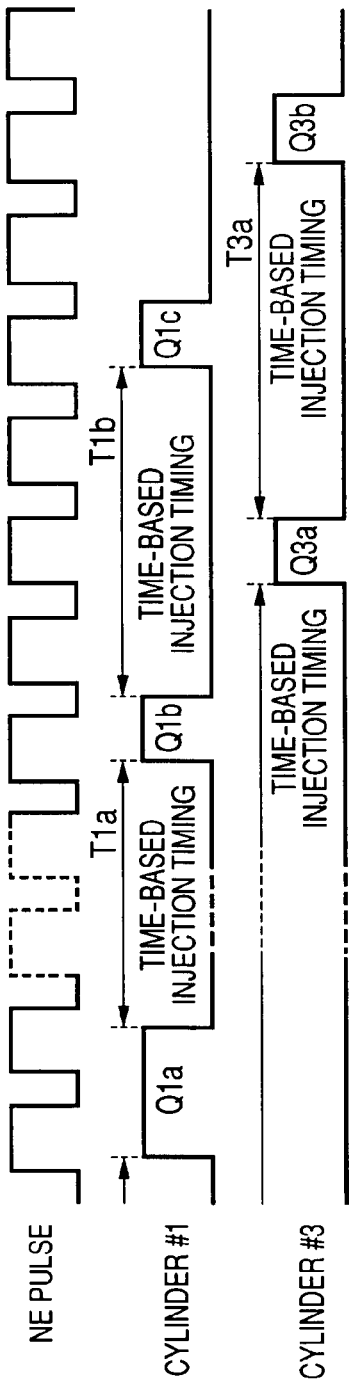
FIG. 8(a) is a timing chart which demonstrates injection timings and durations of a sequence of fuel injection events in the fuel injection control system of FIG. 7.
Figure 8B:
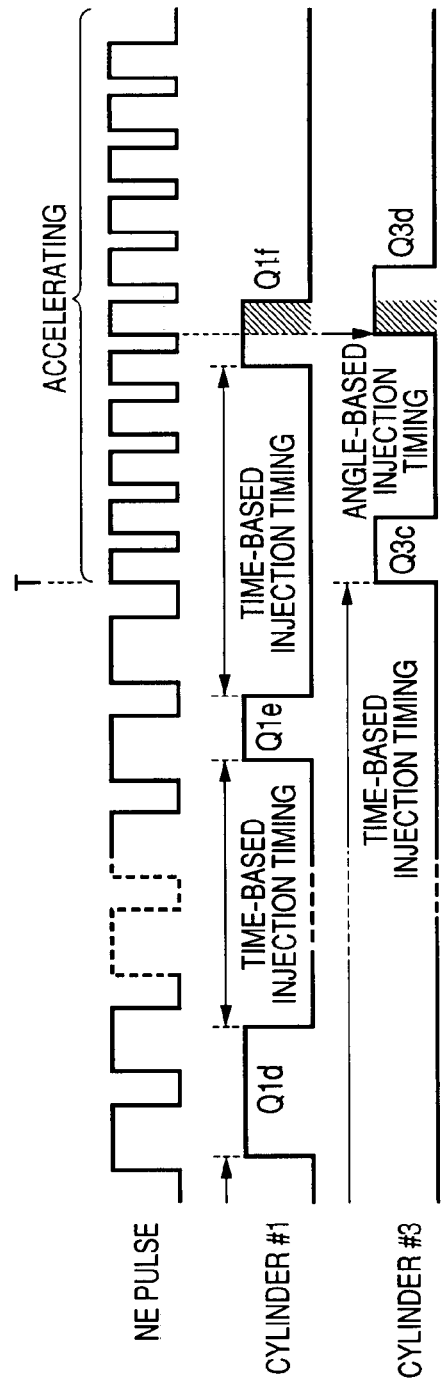
FIG. 8(b) is a timing chart which demonstrates injection timings and durations of a sequence of fuel injection events in the fuel injection control system of FIG. 7 when a diesel engine starts to accelerate from a steady state in which the diesel engine runs at a constant speed.

FIG. 2 illustrates an internal structure of the ECU 6 which is identical with the one in FIG. 7. The explanation of the structure of the ECU 6 in detail will be omitted here.

The ECU 6 is designed to open each of injectors installed in the engine 1 several times to perform multi-injections of fuel into the engine 1 in each engine operating cycle (i.e., a four-stroke cycle) including intake or induction, compression, combustion, and exhaust. Specifically, the ECU 6 works to perform the pilot injection for promoting or activating combustion in the cylinders 2 of the engine 1 and reducing combustion noise and vibrations of the engine 1, the main injection for moving the pistons in the cylinders 2, and the post injection for re-burning the particulate matter resulting from the combustion of an air-fuel mixture.

In the multi-injection mode, the injection duration in one of the first to fourth cylinders 2 may overlap that in another of the cylinders 2. During such an overlap period, the ECU 6 applies the current to corresponding two of the injectors 5 simultaneously to open them. Particularly, when it is required to supply the peak current to open the injectors 5 simultaneously, it will drop in each of the injectors 5, as compared with the peak current is applied to only one of the injectors 5, thus resulting in a delay in opening the injectors 5 and a decrease in quantity of fuel injected into the engine 1. Additionally, the simultaneous supply of the peak current to the injectors 5 will cause a large amount of current to pass through the ECU 6, thus resulting in a large load on the ECU 6. This may be avoided by suspending the overlapping injections of fuel into the engine 1, but however, it may result in instability of running of the vehicle.

In order to alleviate the above problem, the microcomputer 50 of the ECU 6 is designed to execute a fuel injection control program, as illustrated in FIG. 3.

After entering the program, the routine proceeds to step 110 wherein it is determined whether each of a sequence of scheduled injection durations for which the fuel is to be sprayed into any one of the first to fourth cylinders 2 overlaps one of those for which the fuel is to be sprayed into another of the first to fourth cylinders 2 or not. The microcomputer 50 works to execute an injection timing/duration calculating program to determine the injection duration that is the length of time each of the injectors 5 is to be opened based on outputs from the accelerator position sensor, the crank sensor, the coolant temperature sensor, and the intake air temperature sensor. The microcomputer 50 also determines the injection timing at which each of the injectors 5 should be started to be opened to spray the fuel based on the output from the crank sensor (i.e., the angular position of the crankshaft) or time required by the crankshaft to rotate through a given angle. Specifically, the injection timing is determined based on the time consumed by the crankshaft from input of a reference one of the pulses as produced by the crank sensor until the crankshaft advances the given angle. FIGS. 4(a) to 4(e) demonstrate operations in step 110 of FIG. 3.

Injection permission decision charts, as illustrated in FIGS. 4(b) to 4(e), are prepared for the first to fourth cylinders 2 of the engine 1 respectively and used to determine whether the duration of each scheduled event of injection of fuel to any one of the first to fourth cylinders 2 overlaps that to another of the first to fourth cylinders 2 or not. Information about the injection permission decision charts is retained in the RAM 57 of the microcomputer 50.

In the example, as shown in FIGS. 4(a) to 4(e), when having determined durations of fuel injection events Q1a, Q1b, and Q1c for the first cylinder #1 of the engine 1, the microcomputer 50 defines periods of time coinciding with the durations of the fuel injection events Q1a, Q1b, and Q1c as being injection durations for another cylinder in each of the injection permission decision charts for the second, third, and fourth cylinders #2, #3, and #4. In other words, when a sequence of injection durations for the first cylinder #1 has been scheduled, the microcomputer 50 prohibits each of the injectors 5 for the second, third, and fourth cylinders #2, #3, and #4 from spraying the fuel for periods of time in which the injector 5 for another cylinder (i.e., the first cylinder #1) is to be opened to spray the fuel.

Similarly, when having determined durations of fuel injection events Q3a, Q3b, Q3c, and Q3d for the third cylinder #3 of the engine 1, the microcomputer 50 prohibits each of the injectors 5 for the first, second, and fourth cylinders #1, #2, and #4 from spraying the fuel for periods of time in which the third cylinder #3 is to be subjected to the fuel injection.

Next, the microcomputer 50 determines durations of fuel injection events Q2a, Q2b, and Q2c for the second cylinder #2 of the engine 1. The duration of the fuel injection event Q2a, as clearly illustrated in FIGS. 4(c) and 4(d), lies in a time range in which the injector of the second cylinder #2 is prohibited from spraying the fuel (i.e., the duration of the fuel injection event Q3d for the third cylinder #3). Specifically, the microcomputer 50 analyzes the injection permission decision chart for the second cylinder #2 and decides that the duration of the fuel injection event Q2a overlaps that of the fuel injection event Q3d for the third cylinder #3 or alternatively analyzes the injection permission decision chart for the third cylinder #3 and decides that the duration of the fuel injection event Q3a overlaps that of the fuel injection event Q2a for the second cylinder #2.

Subsequently, the microcomputer 50 determines durations of fuel injection events Q4a, Q4b, and Q4c for the fourth cylinder #4 and prohibits each of the injectors 5 for the first, second, and third cylinders #1, #2, and #3 from spraying the fuel for periods of time in which the fourth cylinder #4 is to be subjected to the fuel injection (i.e., the durations of the fuel injection events Q4a, Q4b, and Q4c). The fuel injection events Q1a, Q2a, Q3a, Q4a represent pilot injections of fuel into the first to fourth cylinders #1 to #4 of the engine 1. The fuel injection events Q1b, Q2b, Q3b, Q4b represent main injections. The fuel injection events Q1c, Q2c, Q3c, Q4c represent post injections.

Referring back to FIG. 3, if it is determined in step 110 that the injection durations in each of the first to fourth cylinders #1 to #4 do not overlap those in another of the first to fourth cylinders #1 to #4 at all, then a NO answer is obtained. The routine terminates. Alternatively, if a YES answer is obtained meaning that at least one of the injection durations for any one of the first to fourth cylinders #1 to #4 overlaps that for another of the first to fourth cylinders #1 to #4, then the routine proceeds to step 120 wherein it is determined whether the duration of the main injection for any one of the first to fourth cylinders #1 to #4 overlaps that of another kind of fuel injection (i.e., the pilot or post injection) for another of the first to fourth cylinders #1 to #4 or not. Specifically, it is determined whether either of the fuel injection events which have been determined in step 110 as overlapping each other is the main injection or not. If a YES answer is obtained, then the routine proceeds to step 130 wherein it is determined whether the main injection should be prioritized or not based on the operating conditions of the engine 1 or running conditions of or navigation information about the vehicle. For instance, when the microcomputer 50 monitors data from the navigation ECU 20 representing the position of the vehicle and determines that the vehicle is now traveling on a downward slope or samples an output of the accelerator position sensor and determines that the driver's effort on the accelerator pedal is smaller than a given value, the microcomputer 50 determines that the engine 1 is not required to produce the drive torque to drive the vehicle and that it is not necessary to perform the main injection. In this case, a NO answer is obtained in step 130. The routine, thus, proceeds to step 150. Further, by way of explanation and exemplification, when the durations of the main and post injections overlap each other, and it is determined that the engine 1 is not required to produce the drive torque, a NO answer is obtained in step 130 to prioritize the post injection over the main injection.

In step 150, the microcomputer 50 cancels the schedule of the main injection or shift the timing of the main injection. For example, the microcomputer 30 cancels the schedule of execution of the main injection completely, stops the main injection partially only for a period of time overlapping the duration of the post injection, or reschedules the timing of the main injection which is out of coincidence with those of other types of injection of fuel into the cylinders 2.

If the duration of the main injection overlaps that of the pilot injection, a YES answer is obtained in step 130. The routine then proceeds to step 140.

Alternatively, if it is determined in step 130 that the engine 1 is required to produce the drive torque, for example, that the driver's effort on the accelerator pedal is greater than the given value, or that the driver's effort on the accelerator pedal is smaller than the given value, but the vehicle is now traveling on a horizontal road or an upward slope, a YES answer is obtained meaning that the main injection should be prioritized. The routine, thus, proceeds to step 140 wherein the microcomputer 50, like in step 150, cancels the schedule of execution of the pilot or post injection completely which overlaps the main injection, stops it partially only for a period of time overlapping the duration of the main injection, or reschedules the timing of the pilot or post injection which is out of coincidence with that of the main injection.

If a NO answer is obtained in step 120 meaning that the duration of the main injection is out of those of the pilot injection and the post injection, that is, that the durations of the post and pilot injection overlap each other, then the routine proceeds to step 160 wherein it is determined whether the post injection should be prioritized over the pilot injection or not based on the operating conditions of the engine 1 or running conditions of or navigation information about the vehicle. For instance, the microcomputer 50 samples an output of the differential pressure sensor 17 and determines whether the amount of PM trapped in the particulate matter filter 14 has exceeded a given upper limit or not. When it is determined that the amount of PM is greater than the upper limit, the microcomputer 50 gives the weight to the post injection. In this case, a YES answer is obtained in step 160. Additionally, when it is determined that no drive torque is required by the vehicle based on the driver's effort on the accelerator pedal, a YES answer is obtained in step 160 meaning that the post injection should be prioritized over the pilot injection. Further, the microcomputer 50 works to sample an output from the accelerator position sensor or the crank sensor and determines whether the vehicle is now accelerating or not. If it is determined that the vehicle is accelerating, a NO answer is obtained in step 160 meaning that the pilot injection should be prioritized over the post injection.

If the above conditions for determining that the post injection should be prioritized and that the pilot injection should be prioritized are encountered simultaneously, the microcomputer 50 determines to which of the post and pilot injections the priority should be given according to a predefined control rule.

If a YES answer is obtained in step 160 meaning that the post injection should be prioritized over the pilot injection, then the routine proceeds to step 170 wherein the schedule of execution of the pilot injection that is one of fuel injection events overlapping each other is cancelled. The routine then proceeds to step 180 wherein a target duration and a target start time of the pilot injection to be rescheduled to be executed subsequently are determined. Specifically, the microcomputer 50 re-calculates a target period of time for which and a target time at which the pilot injection is to be performed subsequently so as not to overlap the duration of the post injection, as determined in step 160 to be performed in priority to the pilot injection, or durations of the main injection in the other cylinders 2. The routine proceeds to step 190 wherein the pilot injection is initiated at the time, as determined in step 180, and continued to be performed for the duration, as determined in step 180.

In steps 170 to 190, the microcomputer 50 works to perform the post injection in priority to the pilot injection and reschedule and perform the pilot injection. After step 190, the routine terminates.

Alternatively, if a NO answer is obtained in step 160 meaning that the post injection should not be prioritized over the pilot injection, then the routine proceeds to step 200 wherein the schedule of execution of the post injection is altered or cancelled in favor of the pilot injection. For example, if the post injection is scheduled to be initiated prior to the pilot injection, the microcomputer 50 cuts or omits a portion of the duration of the post injection which follows the instance at which the pilot injection is to be initiated. Specifically, the microcomputer 50 stops executing the post injection upon start of the pilot injection. Alternatively, if the pilot injection is scheduled to be initiated prior to the post injection, the microcomputer 50 cancels the schedule of execution of the post injection completely.

The routine proceeds to step 210 wherein the length of time is calculated which corresponds to the whole of the duration of the post injection if the execution of the post injection has been cancelled in step 200, or the omitted portion of the duration of the post injection if the execution of the post injection has been scheduled to be partially stopped in step 200.

The routine proceeds to step 220 wherein the duration of the post injection to be performed subsequently is determined so as to compensate for the length of time, as calculated in step 210. Specifically, the microcomputer 50 stores the length of time, as calculated in step 210, in the RAM 57, and calculates and extends a period of time for which the post injection is to be performed subsequently by the length of time, as stored in the RAM 57, according to the injection timing/duration calculating program, as described above. In other words, the microcomputer 50 determines the duration of the post injection to be performed subsequently so as to compensate for the quantity of fuel, as lost by the cancellation or partial omission of the post injection event, thereby ensuring the stability in burning out the particulate matter trapped in the particulate matter filter 14. Afterwards, the routine terminates.

The operation of the fuel injection system will be exemplified below with reference to FIGS. 5(a), 5(b), 6(a), and 6(b).

Figure 5A:
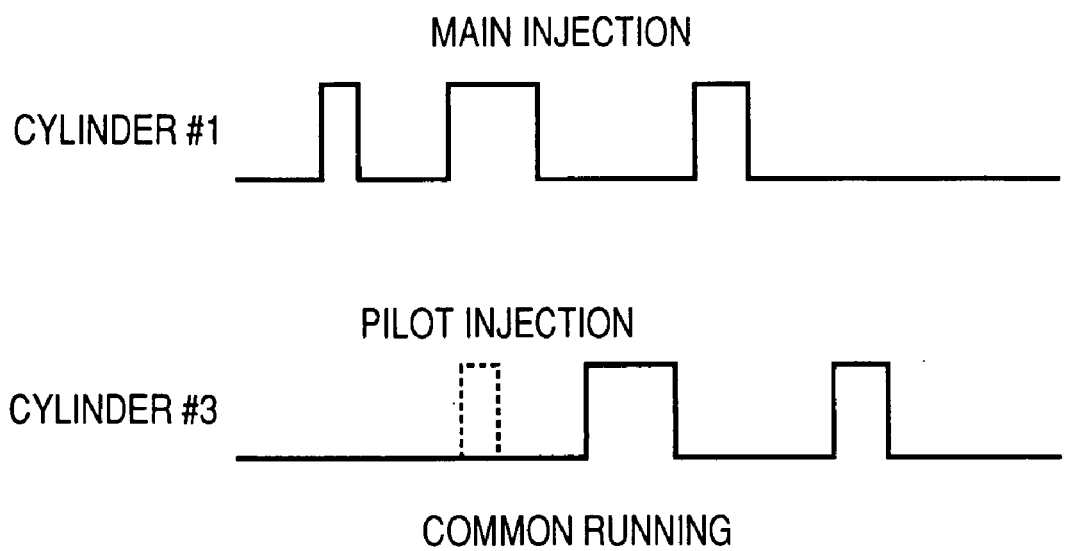
FIG. 5(a) is a timing chart which demonstrates sequences of events of pilot, main, and post injection to be executed in first and third cylinders of an engine in the case where the duration of the main injection scheduled to be achieved in the first cylinder #1 overlaps that of the pilot injection scheduled to be achieved in the third cylinder #3 during a common running condition of a vehicle.

FIG. 5(a) demonstrates for the case where the duration of the main injection scheduled to be achieved in the first cylinder #1 overlaps that of the pilot injection scheduled to be achieved in the third cylinder #3 (i.e., YES answers are obtained in steps 110 and 120) in a common running condition of the vehicle in which the accelerator pedal is depressed.

In the example of FIG. 5(a), the microcomputer 50 determines in step 130 of FIG. 3 that the engine 1 is required to produce the drive torque, and the priority should be given to the main injection in the first cylinder #1, and in step 140 cancels the schedule of execution of the pilot injection in the third cylinder #3 which is overlapping in the injection duration with the main injection in the first cylinder #1, thereby ensuring the stability of running of the vehicle. The microcomputer 50 may alternatively shift the timing of the pilot injection in the third cylinder #3 out of that of the main injection in the first cylinder #1.

Figure 5B:
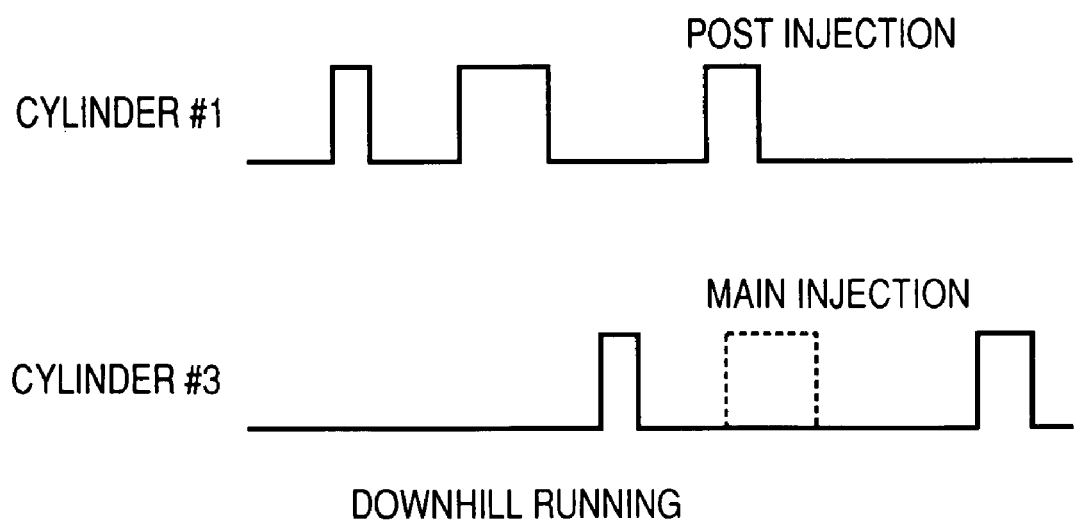
FIG. 5(b) is a timing chart which demonstrates sequences of events of pilot, main, and post injection to be executed in first and third cylinders of an engine in the case where the duration of the post injection scheduled to be achieved in the first cylinder #1 overlaps that of the main injection scheduled to be achieved in the third cylinder #3 in a downhill running condition of a vehicle in which the vehicle is running on a downhill, and the driver's effort on an accelerator pedal is small or zero.

FIG. 5(b) demonstrates for the case where the duration of the post injection scheduled to be achieved in the first cylinder #1 overlaps that of the main injection scheduled to be achieved in the third cylinder #3 (i.e., YES answers are obtained in steps 110 and 120) in a downhill running condition of the vehicle in which the vehicle is running on a downhill, and the driver's effort on the accelerator pedal is small or zero.

In the example of FIG. 5(b), the microcomputer 50 determines in step 130 of FIG. 3 that the engine 1 is not required to produce the drive torque, and it is unnecessary to give the priority the main injection in the third cylinder #3, and in step 150 cancels the execution of the main injection in the third cylinder #3 and performs the post injection in the first cylinder #1 in favor of cleaning up the exhaust emissions from the engine 1. The microcomputer 50 may alternatively pause the main injection in the third cylinder #3 partially only for a period of time overlapping the duration of the post injection in the first cylinder #1 or re-sets the timing of the main injection out of coincidence with that of the post injection.

Figure 6A:
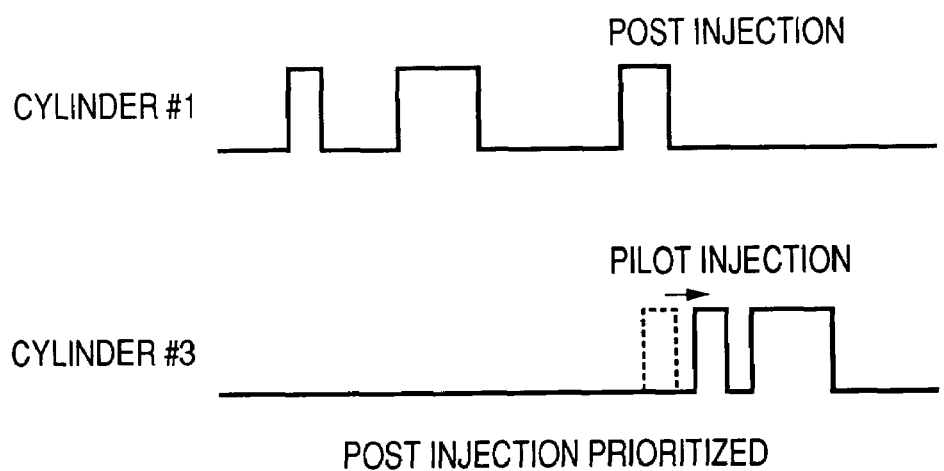
FIG. 6(a) is a timing chart which demonstrates sequences of events of pilot, main, and post injection to be executed in first and third cylinders of an engine in the case where the duration of the post injection overlaps that of the pilot injection and it is determined that the timing of the pilot injection should be shifted.
Figure 6B:
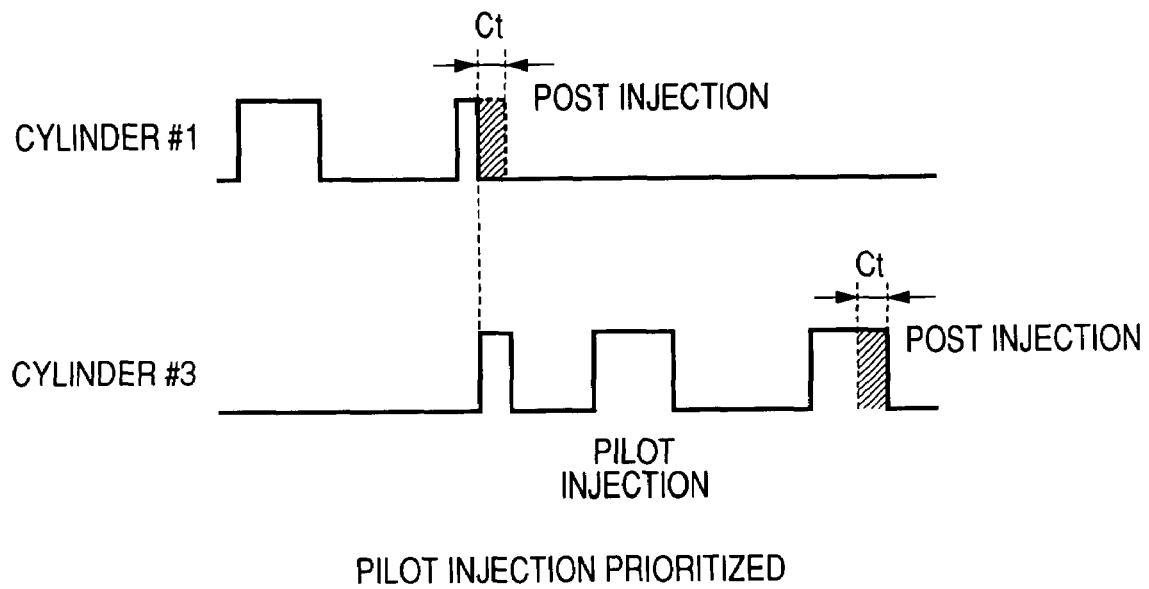
FIG. 6(b) is a timing chart which demonstrates sequences of events of pilot, main, and post injection to be executed in first and third cylinders of an engine in the case where the duration of the post injection overlaps that of the pilot injection and it is determined that a portion of the duration of the post injection should be omitted.

FIGS. 6(a) and 6(b) demonstrate for the case where the duration of the post injection scheduled to be achieved in the first cylinder #1 overlaps the duration of the pilot injection scheduled to be achieved in the third cylinder #3 (i.e., YES answer is obtained in step 110, and NO answer is obtained in step 120).

If the amount of PM trapped in the particulate matter filter 14 is determined to be greater than the given upper limit or the engine 1 is not required to produce the drive torque to drive the vehicle, the microcomputer 50, as can be seen in FIG. 6(a), determines in step 160 of FIG. 3 that the priority should be given to the post injection in the first cylinder #1 and in step 170 cancels the scheduled execution of the pilot injection in the third cylinder #3. The microcomputer 50 re-calculates in step 180 the timing of the pilot injection to be achieved in the third cylinder #3 so as to bring the event of the pilot injection out of that of the post injection in the first cylinder #1. The microcomputer 50 initiates in step 190 the pilot injection in the third cylinder #3 at the time, as calculated in step 180.

Alternatively, if it is determined that the vehicle is now accelerating, the microcomputer 50 determines in step 160 that the priority should be given to the pilot injection and in step 200 cancels or alters the schedule of the post injection in the first cylinder #1.

In the example of FIG. 6(*b*), the injection timing or start of the pilot injection in the third cylinder #3 lies in the duration of the post injection in the first cylinder #1, and the microcomputer 50 cuts the execution of the post injection upon the start of the pilot injection in the third cylinder #3, thereby ensuring the stability of running of the engine 1. Specifically, the microcomputer 50 performs the pilot injection to promote or activate combustion of fuel sprayed by the main injection into the third cylinder #3. The microcomputer 50 may alternatively cancel the schedule of execution of the post injection in the first cylinder #1 completely.

The microcomputer 50 also determines in step 210 of FIG. 3 an omitted portion Ct of the duration of the post injection in the first cylinder #1 and in step 220 adds it to an already scheduled duration of the post injection to be achieved in the third cylinder #3, thereby ensuring the stability in burning out the particulate matter trapped in the particulate matter filter 14. The microcomputer 50 may alternatively work to increase the quantity of fuel to be sprayed into the third cylinder #3 in a subsequent event of the post injection without adding the omitted portion Ct to the scheduled duration of the post injection in order to compensate for a lack of the quantity of fuel arising from the omission of the duration of the post injection in the first cylinder #1. This may be achieved by elevating the pressure of fuel in the common rail 4 to increase the quantity of fuel to be sprayed into the engine 1 per unit time.

As apparent from the above discussion, the fuel injection control system is designed to schedule the execution of a sequence of multiple injections to be achieved in each of the cylinders 2 of the engine 1. If the time duration of one of the sequential events of injection to be achieved in any one of the cylinders 2 overlaps at least partially with that of one of the sequential events of injection to be achieved in another of the cylinders 2, the fuel injection control system works to cancel or reschedule one of the two overlapping events of injection so as to eliminate such overlap without sacrificing the stability of running of the vehicle, thereby avoiding the problems that the simultaneous application of, especially peak current to two of the injectors 5 which overlap in the events of injection with each other results in an undesirable decrease in amount of current passing through each of the two injectors 5, thus leading to a delay in opening the injectors 5 resulting in a lack of quantity of fuel sprayed into the cylinders 2, and also causes an unusual large electrical load to act on the ECU 6 working to supply the current to each of the injectors 5.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments witch can be embodied without departing from the principle of the invention as set forth in the appended claims. For example, the fuel injection control system may be designed to perform pre-injection and after-injection of fuel into the engine 1 in addition to the pilot, main, and post injection. Further, the fuel injection control system may also be designed to execute one or some of the pre-injection, the pilot injection, the main injection, the post injection, and the after-injection two or more times in each of the operating cycle of the engine 1. The engine 1, as used in the above embodiment, has four cylinders, but may also be engineered to have two cylinders or six or more cylinders.

What is claimed is:

1. A fuel injection control apparatus for a multi-cylinder internal combustion engine mounted in a vehicle comprising:

injectors each of which, when energized, works to spray fuel into one of cylinders of an engine of a vehicle;

an operating condition determining circuit working to determine preselected operating conditions of the engine and the vehicle; and a controller working to schedule execution of a sequence of multiple injections of the fuel into each of the cylinders through control of a corresponding one of said injectors in each operating cycle of the engine based on the operating conditions, as determined by said operating condition determining circuit, said controller determining whether an overlapping condition where events of any two of the injections scheduled to be executed in any two of the cylinders overlap in time with each other is met or not, when the overlapping condition is determined to be met, said controller determining which of the two of the injections overlapping each other should be rescheduled based on the operating condition of the vehicle, as determined by said operating condition determining circuit, and rescheduling execution of one of the two of the injections, as determined to be rescheduled, so as to eliminate overlap with any of the events of the injections.

2. A fuel injection control apparatus as set forth in claim 1, wherein said controller works to perform one of a first rescheduling operation and a second rescheduling operation, the first rescheduling operation being to shift timing of the one of the injections, as determined to be rescheduled, so as to eliminate the overlap with any of the events of the injections, the second rescheduling operation being to omit at least a portion of a duration of the one of the injection, as determined to be rescheduled, so as to eliminate overlap with other of the two of the injections.

3. A fuel injection control apparatus as set forth in claim 1, wherein the sequence of multiple injections of the fuel into each of the cylinders includes a main injection to operate the engine, a first sub-injection to be executed prior to the main injection to activate inside of the cylinder, and a second sub-injection to be executed following the main injection to burn out particulate matter, as produced by combustion of the fuel in the engine, and wherein said controller determines as the overlapping condition whether a duration of each of the main injection, the first sub-injection, and the second sub-injection, as scheduled to be executed in one of the cylinders, overlaps that of one of the main injection, the first sub-injection, and the second sub-injection, as scheduled to be executed in another of the cylinders, or not.

4. A fuel injection control apparatus as set forth in claim 3, wherein said controller monitors the operating condition of the vehicle, as determined by said operating condition determining circuit, to determine whether drive torque is required by the vehicle or not, and wherein when it is determined that the duration of one of the first sub-injection and the second sub-injection scheduled to be executed in one of the cylinders overlaps that of the main injection scheduled to be executed in another of the cylinders and that the drive torque is determined to be required by the vehicle, said controller reschedules the execution of the one of the first sub-injection and the second sub-injection, as determined as overlapping in the duration thereof with the main injection, so as to eliminate overlap with any of the events of the injections.

5. A fuel injection control apparatus as set forth in claim 3, wherein said controller moflitors the operating condition of the vehicle, as determined by said operating condition determining circuit, to determine whether no drive torque is required by the vehicle or not, and wherein when it is determined that the duration of one of the main injection and the first sub-injection scheduled to be executed in one of the cylinders overlaps that of the second sub-injection scheduled to be executed in another of the cylinders and that no drive torque is determined to be required by the vehicle, said controller reschedules the execution of the one of the main injection and the first sub-injection, as determined as overlapping in the duration thereof with the second sub-injection, so as to eliminate overlap with any of the events of the injections.

6. A fuel injection control apparatus as set forth in claim 3, wherein the particulate matter is to be trapped in a filter, wherein the second sub-injection serves to burn out the particulate matter trapped in the filter, and wherein said controller works to determine whether an amount of the particulate matter trapped in the filter is greater than a given value or not, when it is determined that the duration of one of the main injection and the first sub-injection scheduled to be executed in one of the cylinders overlaps that of the second sub-injection scheduled to be executed in another of the cylinders and that the amount of the particulate matter is greater than the given value, said controller rescheduling the execution of the one of the main injection and the first sub-injection, as determined as overlapping in the duration thereof with the second sub-injection, so as to eliminate overlap with any of the events of the injections.

7. A fuel injection control apparatus as set forth in claim 3, wherein said controller monitors the operating condition of the vehicle, as determined by said operating condition determining circuit, to determine whether the vehicle is acceleration or not, and wherein when it is determined that the duration of the second sub-injection scheduled to be executed in one of the cylinders overlaps that of the first sub-injection scheduled to be executed in another of the cylinders and that the vehicle is accelerating, said controller reschedules the execution of the second sub-injection, as determined as overlapping in the duration thereof with the first sub-injection, so as to eliminate overlap with any of the events of the injections.

8. A fuel injection control apparatus as set forth in claim 3, wherein when it is determined that the second sub-injection, as scheduled to be executed in one of the cylinders, overlaps that of one of the main injection, the first sub-injection, and the second sub-injection, as scheduled to be executed in another of the cylinders, said controller works to omit at least a portion of the duration of the second sub-injection, as determined as overlapping that of the one, so as to eliminate overlap with the one, and also determine a duration of the second sub-injection scheduled to be executed subsequently in one of the cylinders so as to compensate for the omitted portion of the duration of the second sub-injection.

9. A fuel injection control apparatus for a multi-cylinder internal combustion engine mounted in a vehicle comprising:
  injectors each of which, when energized, works to spray fuel into one of cylinders of an engine of a vehicle;
  an operating condition determining circuit working to determine preselected operating conditions of the engine and the vehicle; and
  a controller working to schedule execution of a sequence of multiple injections of the fuel into each of the cylinders through control of a corresponding one of said injectors in each operating cycle of the engine based on the operating conditions, as determined by said operating condition determining circuit, said controller determining whether an overlapping condition where events of any two of the injections scheduled to be executed in any two of the cylinders overlap in time with each other is met or not, when the overlapping condition is determined to be met, said controller determining which of the two of the injections overlapping each other should be rescheduled based on the operating condition of the vehicle, as determined by said operating condition determining circuit, and rescheduling execution of one of the two of the injections, as determined to be rescheduled, so as to eliminate overlap with any of the events of the injections;
  wherein said rescheduling execution of one of the two of the injections comprises time-shifting of the one of the two of the injections, as determined to be rescheduled, so as to eliminate the overlap with any of the events of the injections.

10. A fuel injection control apparatus for a multi-cylinder internal combustion engine mounted in a vehicle, the apparatus comprising:
  fuel injectors each of which spray fuel into a respective one of cylinders of an engine of a vehicle;
  an operating condition determining circuit which determines preselected operating conditions of the engine and the vehicle; and
  a controller which schedules execution of a sequence of multiple injections of the fuel into each of the cylinders through control of a corresponding one of said injectors in each operating cycle of the engine based on the operating conditions, as determined by said operating condition determining circuit,
  wherein said controller determines whether an overlapping condition where events of any two of the injections scheduled to be executed in any two of the cylinders overlap in time with each other is met or not, when the overlapping condition is determined to be met, said controller determines a priority of which of the two of the injections overlapping each other should be rescheduled based on the operating condition of the vehicle, each of the two overlapping injections being capable of being re-scheduled, as determined by said operating condition determining circuit, and reschedules execution of one of the two of the injections, as determined to be rescheduled, so as to eliminate overlap with any of the events of the injections.

11. A fuel injection control apparatus as set forth in claim 10, wherein said controller performs one of a first rescheduling operation and a second rescheduling operation, the first rescheduling operation being to shift timing of the one of the injections, as determined to be rescheduled, so as to eliminate the overlap with any of the events of the injections, the second rescheduling operation being to omit at least a portion of a duration of the one of the injection, as determined to be rescheduled, so as to eliminate overlap with other of the two of the injections.

12. A fuel injection control apparatus as set forth in claim 10, wherein the sequence of multiple injections of the fuel into each of the cylinders includes a main injection to operate the engine, a first sub-injection to be executed prior to the main injection to activate inside of the cylinder, and a second sub-injection to be executed following the main injection to burn out particulate matter, as produced by combustion of the fuel in the engine, and wherein said controller determines as the overlapping condition whether a duration of each of the main injection, the first sub-injection, and the second sub-injection, as scheduled to be executed in one of the cylinders, overlaps that of one of the main injection, the first sub-injection, and the second sub-injection, as scheduled to be executed in another of the cylinders, or not.

13. A fuel injection control apparatus as set forth in claim 12, wherein said controller monitors the operating condition of the vehicle, as determined by said operating condition determining circuit, to determine whether drive torque is required by the vehicle or not, and wherein when it is determined that the duration of one of the first sub-injection and the second sub-injection scheduled to be executed in one of the cylinders overlaps that of the main injection scheduled to be executed in another of the cylinders and that the drive torque is determined to be required by the vehicle, said controller reschedules the execution of the one of the first sub-injection and the second sub-injection, as determined as overlapping in the duration thereof with the main injection, so as to eliminate overlap with any of the events of the injections.

14. A fuel injection control apparatus as set forth in claim 12, wherein said controller monitors the operating condition of the vehicle, as determined by said operating condition determining circuit, to determine whether no drive torque is required by the vehicle or not, and wherein when it is determined that the duration of one of the main injection and the first sub-injection scheduled to be executed in one of the cylinders overlaps that of the second sub-injection scheduled to be executed in another of the cylinders and that no drive torque is determined to be required by the vehicle, said controller reschedules the execution of the one of the main injection and the first sub-injection, as determined as overlapping in the duration thereof with the second sub-injection, so as to eliminate overlap with any of the events of the injections.

15. A fuel injection control apparatus as set forth in claim 12, wherein the particulate matter is to be trapped in a filter, wherein the second sub-injection serves to burn out the particulate matter trapped in the filter, and wherein said controller determines whether an amount of the particulate matter trapped in the filter is greater than a given value or not, when it is determined that the duration of one of the main injection and the first sub-injection scheduled to be executed in one of the cylinders overlaps that of the second sub-injection scheduled to be executed in another of the cylinders and that the amount of the particulate matter is greater than the given value, said controller rescheduling the execution of the one of the main injection and the first sub-injection, as determined as overlapping in the duration thereof with the second sub-injection, so as to eliminate overlap with any of the events of the injections.

16. A fuel injection control apparatus as set forth in claim 12, wherein said controller monitors the operating condition of the vehicle, as determined by said operating condition determining circuit, to determine whether the vehicle is acceleration or not, and wherein when it is determined that the duration of the second sub-injection scheduled to be executed in one of the cylinders overlaps that of the first sub-injection scheduled to be executed in another of the cylinders and that the vehicle is accelerating, said controller reschedules the execution of the second sub-injection, as determined as overlapping in the duration thereof with the first sub-injection, so as to eliminate overlap with any of the events of the injections.

17. A fuel injection control apparatus as set forth in claim 12, wherein when it is determined that the second sub-injection, as scheduled to be executed in one of the cylinders, overlaps that of one of the main injection, the first sub-injection, and the second sub-injection, as scheduled to be executed in another of the cylinders, said controller omits at least a portion of the duration of the second sub-injection, as determined as overlapping that of the one, so as to eliminate overlap with the one, and also determine a duration of the second sub-injection scheduled to be executed subsequently in one of the cylinders so as to compensate for the omitted portion of the duration of the second sub-injection.

18. A fuel injection control apparatus as set forth in claim 10, wherein said controller performs a rescheduling operation which time-shifts a scheduled execution of the one of the two of the injections, as determined to be rescheduled, so as to eliminate the overlap with any of the events of the injections.

* * * * *

UNITED STATES PATENT AND TRADEMARK OFFICE
CERTIFICATE OF CORRECTION

PATENT NO. : 7,395,807 B2  Page 1 of 1
APPLICATION NO. : 11/724231
DATED : July 8, 2008
INVENTOR(S) : Watanabe It is certified that error appears in the above-identified patent and that said Letters Patent is hereby corrected as shown below:

On the title page, item (75) should read:

Inventors: Mitsuru Watanabe, Oobu (JP)

Signed and Sealed this

Second Day of September, 2008

JON W. DUDAS
*Director of the United States Patent and Trademark Office*